July 19, 1938. L. FRÄNKEL 2,124,248
CAMERA DIAPHRAGM ADJUSTING AND INDICATING MECHANISM
Filed Nov. 13, 1935
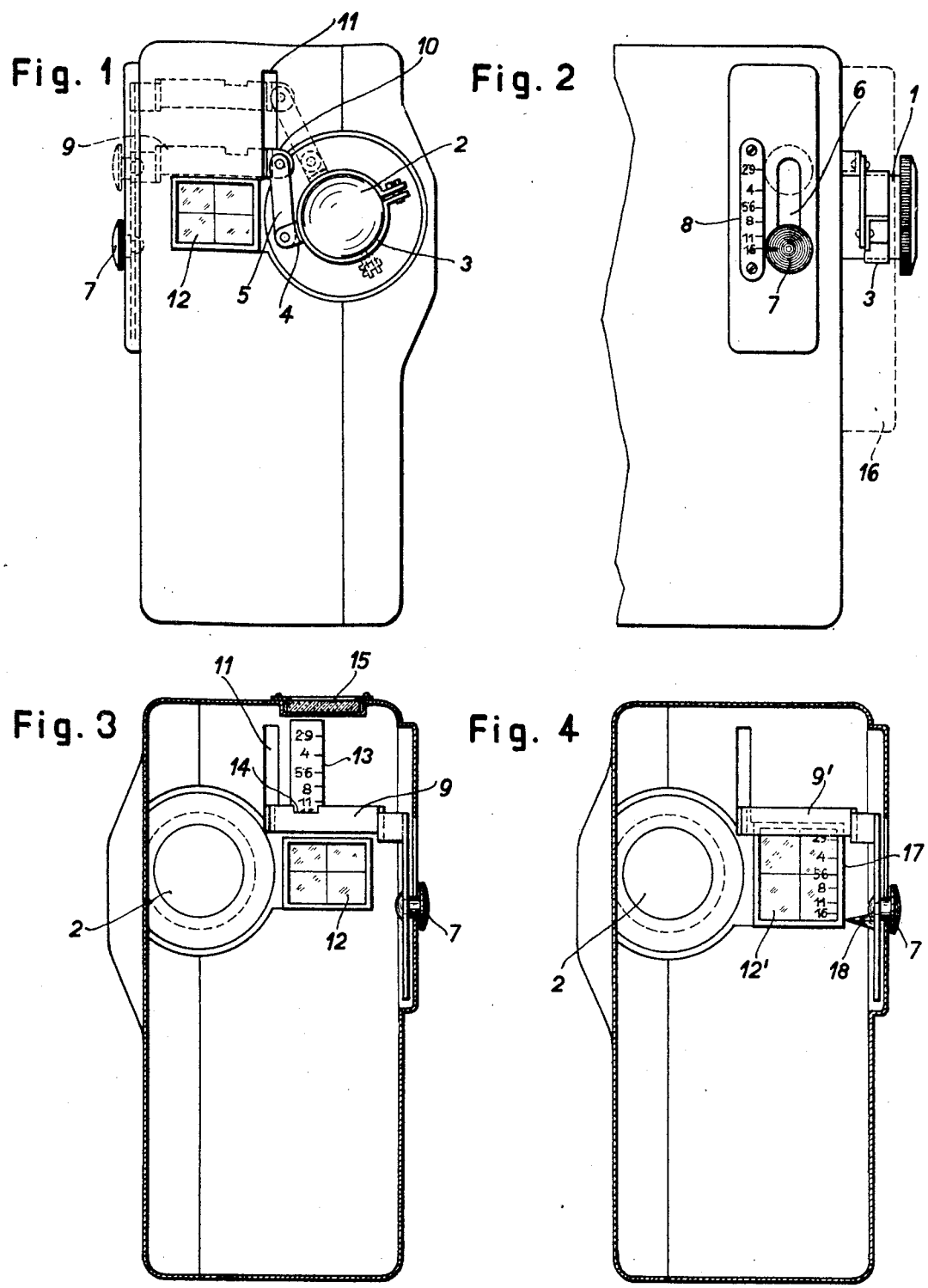

Patented July 19, 1938

2,124,248

UNITED STATES PATENT OFFICE 2,124,248

CAMERA DIAPHRAGM ADJUSTING AND INDICATING MECHANISM

Leo Fränkel, Vienna, Austria, assignor to Lampen-und Metallwarenfabrieken R. Ditmar Gebruder Brunner A. G., Vienna, Austria, a company of Austria Application November 13, 1935, Serial No. 49,629
In Austria November 22, 1934

2 Claims. (Cl. 88—16)

In most cases the diaphragm of a cinematographic camera is adjusted by means of a ring concentric with the lens. This has the disadvantage that when working without a stand, as is customary amongst amateurs, the diaphragm can be adjusted during the operation or exposure either with great difficulty or not at all.

The adjustment of the diaphragm during the operation is of particular importance in amateur cinematographic apparatus as compared with other adjustments, as for example of the focussing, since the reversal process commonly used for substandard films does not allow of subsequent correction of incorrectly exposed films. For example, large objects, such as buildings, are photographed in the form of a panorama by taking the individual parts successively. It may easily occur that a part of the building lies in the shadow and another in the brightest sunlight so that a satisfactory exposure can only be obtained if the differences in brightness are taken into consideration by adjustment of the diaphragm during the exposure. An adjustment of the diaphragm during the exposure is also especially desirable in taking moving or animated objects, since these frequently move out of the shadow into the sunlight or vice versa during the scene which is being filmed.

The main object of the present invention is to provide a diaphragm control device for cinematographic cameras adapted to make exposure while held in the operator's hands, which enables both observation of the position of the diaphragm, and adjustment of the latter during the operation without shaking the camera. A further object of the invention is to provide a diaphragm control device by which the position of the diaphragm can be observed without removing the eye from the eye piece of the view finder. Another object of the invention is to arrange the hand operated diaphragm adjusting member within reach of the fingers of the hand holding the camera in the taking position, without the necessity of removing them from their holding position. A still further object of the invention is to arrange the diaphragm control device as far as possible in the interior of the camera in order to obtain a pleasing appearance of the camera.

The arrangement, according to the invention, is illustrated, by way of example, in the accompanying drawing, in which Fig. 1 is a front elevation and Fig. 2 is a side elevation of the front part of the camera, Fig. 3 shows the front wall of the camera as seen from inside, Fig. 4 is a view similar to Fig. 3 of a modified construction of the camera.

As shown in Figs. 1 to 3, the diaphragm ring 1 of the lens 2 is surrounded by a clamping ring 3, having a lug 4 which is engaged by a link member 5. An adjusting knob 7, the position of which can be read off on a diaphragm scale 8 provided on the side wall of the camera, is guided vertically in a slot 6 in a side wall of the camera. The knob 7 is connected with a rod 9 which can be displaced parallel to itself along the inner side of the front wall of the camera and the cranked end 10 of which passes through a slot in the front wall of the camera outwards and is connected with the link member 5. When using lenses which can be adjusted axially for focussing (lenses with focussing mounts), it is possible to provide, for example between the parts 4 and 5, a small amount of clearance in the direction of the optical axis of the camera in order to avoid binding of the transmission rod-work or linkage 4, 5, 9 when the lens is displaced axially.

According to Figure 3 there is secured on the inner side of the front wall of the camera above the finder lens 12 of the view finder a diaphragm scale 13, over which the indicating edge 14 of the rod 9 moves. In the upper wall of the camera there is inserted a ground glass window 15 through which the scale 13 is illuminated. The movable parts 3, 5 and 10 arranged on the front wall of the camera and the slot 11 are covered by a removable cap 16, shown in Figure 2 in broken lines.

The lowest position of the knob 7 corresponds to the largest aperture and the uppermost position to the smallest aperture. It is clear that the knob 7 can easily be actuated with one finger of the right hand which holds the camera, while at the same time another finger of this hand can operate the control member for the motor which may be disposed on the same side wall as the knob 7 or on the front wall of the camera without the hand having to be moved from the normal position for holding the camera. The eye-piece (not shown) of the view finder is arranged in the usual manner in the wall of the camera opposite to the front wall containing the finder lens 12. The eye looking through this eye-piece sees when the pupil is turned upwards slightly the indicating device comprising the scale 13 and edge 14 and, therefore, the diaphragm setting can be observed conveniently during the exposure.

As is clear from Figure 1 a transmitting member 5 is articulated to the diaphragm ring 1, as well as to the adjusting knob 7. By this means, in contradistinction to an arrangement in which the adjusting member is rigidly connected with the diaphragm ring, the size and shape of the track of the adjusting knob 7 is made independent of the given maximum angle of rotation of the diaphragm ring.

In the constructional form shown in Figure 4 a knob 7 guided vertically is again connected through a rod 9' with the diaphragm ring. The distinction from the preceding example consists in that the diaphragm scale 17 is transferred to the view finder lens 12' itself, which lens for this purpose may be correspondingly larger. A pointer 18 connected directly with the knob 7 cooperates with the scale 17.

The adjusting member for the diaphragm may be constructed as a slidable or rotatable handle, lever or the like and may be arranged on the front wall of the camera in such a manner that it can readily be actuated by a finger of the hand holding the camera, it being necessary however that the adjusting member should be at a sufficient distance from the lens to avoid a part of the lens being covered by the finger which actuates the adjusting member.

What I claim is:—

1. A diaphragm control and indicating device for cinematographic cameras adapted to make exposure while held in the operator's hands, and having a view finder provided with an eye-piece, and having a diaphragm provided with an adjusting ring member, comprising an indicating device showing the position of the diaphragm in the field of view of the operator with his eye in position to observe through the eye-piece of the view finder, a hand operated diaphragm ring adjusting mechanism arranged in the vicinity of the front wall of the camera comprising a substantially rectilinear guide, and a slide adapted to follow said guide, and a motion transmitting element interposed between and interconnecting said slide and the diaphragm adjusting ring and movable relatively to said diaphragm ring, said motion transmitting mechanism converting the rectilinear motion of the guide into rotary motion of the diaphragm ring.

2. A diaphragm control device for cinematographic cameras adapted to make exposure while held in the operator's hands, and having a view finder provided with an eye piece and having a diaphragm provided with an adjusting ring, comprising a diaphragm scale arranged in the interior of the camera so as to be visible through the eye piece of the view finder, a window in the wall of the camera to illuminate said scale, a hand operated diaphragm adjusting member rectilinearly, slidably mounted in the camera wall in the vicinity of the front wall of the camera, a pointer connected to said adjusting member and cooperating in the interior of the camera with said scale to indicate the diaphragm adjustment, and a motion transmitting element interposed between, and interconnecting said adjusting member and the diaphragm adjusting ring, said motion transmitting means including means for converting rectilinear motion into rotary motion.

LEO FRÄNKEL.